US006137463A

United States Patent [19]

Tagawa et al.

[11] Patent Number: 6,137,463

[45] Date of Patent: Oct. 24, 2000

[54] LIQUID CRYSTAL DEVICE AND METHOD OF ADDRESSING A LIQUID CRYSTAL DEVICE

[75] Inventors: Akira Tagawa, Kashiwa, Japan; Paul Bonnett, Littlemore; Michael John Towler, Botley, both of United Kingdom

[73] Assignee: Sharp Kabushiki Kaisha, Osaka, Japan

[21] Appl. No.: 09/086,039

[22] Filed: May 28, 1998

[30] Foreign Application Priority Data

Jun. 20, 1997 [GB] United Kingdom .................. 9712946

[51] Int. Cl.[7] .................. G02F 1/13

[52] U.S. Cl. .................. 345/97

[58] Field of Search .................. 345/97, 58, 94, 345/96; 349/1, 184

[56] References Cited

U.S. PATENT DOCUMENTS

| | | | |
|---|---|---|---|
| 4,929,058 | 5/1990 | Numao | 345/89 |
| 5,119,219 | 6/1992 | Terada et al. | 349/37 |
| 5,289,175 | 2/1994 | Kawagishi | 345/97 |
| 5,602,559 | 2/1997 | Kimura | 345/89 |
| 5,638,195 | 6/1997 | Katakura et al. | 349/143 |
| 5,764,211 | 6/1998 | Tagawa et al. | 345/97 |
| 5,844,537 | 12/1998 | Bonnett et al. | 345/97 |
| 5,905,482 | 5/1999 | Hughes et al. | 345/89 |
| 5,940,060 | 8/1999 | Raynes et al. | 345/97 |

FOREIGN PATENT DOCUMENTS

| | | |
|---|---|---|
| 63-151929 | 6/1988 | European Pat. Off. . |
| 0337780 | 10/1989 | European Pat. Off. . |
| 0526095 | 2/1993 | European Pat. Off. . |
| 0710945 | 5/1996 | European Pat. Off. . |
| 3-189622 | 8/1991 | Japan . |
| 8-050278 | 2/1996 | Japan . |
| 2293906 | 4/1996 | United Kingdom . |
| 9515548 | 6/1995 | WIPO . |

OTHER PUBLICATIONS

Search Report for Application No. 98304187.2–2201–; Dated Oct. 16, 1998 (EPO).

Search Report for Application No. GB 9712946.4; Dated Sep. 12, 1997.

P.W.H. Surguy et al., Ferroelectrics, vol. 122, pp. 63–79, 1991, "The 'Joers/Alvey' Ferroelectric Multiplexing Scheme".

H. Katsuse et al., Ferroelectrics, vol. 149, pp. 353–360, 1993, "A Set Of Matrix Addressing Waveforms for the t–V min Mode in Ferroelectric Liquid Crystal Displays".

J.R. Hughes et al., Liquid Crystals, vol. 13, No. 4, pp. 597–601, 1993, "A New Set Of High Speed Matrix Addressing Schemes for Ferroelectric Liquid Crystal Display".

*Primary Examiner*—Vijay Shankar
*Assistant Examiner*—Jeff Piziali
*Attorney, Agent, or Firm*—Renner, Otto, Boisselle & Sklar LLP

[57] ABSTRACT

A ferroelectric liquid crystal display comprises data electrodes and strobe electrodes which are connected to data and signal generators. The strobe signal generator supplies strobe signals sequentially to groups of more than one strobe electrode. For instance, the strobe electrodes may be strobed in pairs with the strobe signals being supplied simultaneously to the electrodes of each pair. The data signal generator supplies any of a plurality of different data signals to each of the data electrodes in synchronism with the strobe signals. The data signals are such that all combinations of optical states for the pixels which are connected to the same data electrode and which are strobed simultaneously can be achieved.

12 Claims, 14 Drawing Sheets

LIQUID CRYSTAL DEVICE AND METHOD OF ADDRESSING A LIQUID CRYSTAL DEVICE

TECHNICAL FIELD OF THE INVENTION

The present invention relates to a liquid crystal device, such as a ferroelectric liquid crystal display panel, and to a method of addressing such a device.

DESCRIPTION OF THE RELATED ART

Ferroelectric liquid crystal displays (FLCDs) are considered as suitable candidates for large size high content display panels, for instance for use in high definition television (HDTV). FLCDs have characteristics such as memory effect, fast response time and wide viewing angle which make them attractive for such applications.

HDTV displays typically require approximately 1,000 scanning lines. All of the lines are scanned sequentially within a short frame time to allow frame repetition rates of the order of seventy frames per second. Although FLCDs have much faster response times than conventional nematic liquid crystal devices (LCDs), ferroelectric liquid crystal (FLC) materials are not always fast enough for 1,000 lines to be scanned within a frame time. Further, FLC has only two stable states corresponding to a black state and a white state. HDTV applications require grey scale and one technique for achieving this is known as "temporal dither". In accordance with this technique, each frame of display data is repeated several times within the normal frame time and the state of each pixel can be changed between frames so that the temporal average over the whole frame time can represent a grey level between the black and white states. However, such temporal dithering requires faster FLC response according to the number of frame repetitions within the frame time.

The FLC layer in an FLCD is disposed between aligning layers and addressing electrodes with a cell thickness which is typically of the order of between 1 and 2 micrometres. This gives rise to a relatively large capacitance between the electrodes on either side of the FLC layer, which electrodes are commonly arranged as parallel data electrodes on one side of the layer and orthogonal strobe electrodes on the other side of the layer. High frame rates require addressing signals of relatively high frequency which leads to relatively high power dissipation within an FLCD and hence heating of the FLCD.

JP H03-189622 (publication number) discloses an arrangement in which each strobe or scanning electrode is divided into a plurality of sub-electrodes connected together via resistances. Thus, the sub-electrodes are connected to drivers for supplying strobe or scanning signals via resistances of varying values. The sub-electrodes of each strobe electrode are scanned simultaneously by the same strobe voltage. The presence of the resistances results in different voltage drops and/or phase delays occurring among the sub-electrodes so that the effective strobe voltages for the sub-electrodes are different from each other.

The scanning electrodes are normally made of indium tin oxide (ITO) which is of relatively low conductivity. The strobe signals therefore undergo a phase delay which increases with pixel distance from the end of the scanning electrode to which the driver is connected. In order to provide a uniform image over the whole of an FLCD panel, pixels at the ends of the scanning electrodes near to the drivers and connected via larger resistances have to have larger phase delays than those at the remote ends of the electrodes connected to drivers via lower resistances. Pixels at the remote ends of the electrodes connected via larger resistances suffer from much larger phase delays. Consequently, a larger line address time (LAT) may be needed in order to ensure switching of pixels at the remote ends of the electrodes.

The arrangement disclosed in JP H03-189622 (publication number) is also such that independent control by the sub-electrodes cannot be fully achieved. For instance, if there were n sub-electrodes which were independently controlled, it would be possible to achieve $2^n$ switching states. However, the arrangement of the Japanese patent can only achieve (n+1) switching states. For instance, if each scanning electrode consists of two sub-electrodes, fully independent control would give four combinations of states of the two halves of each pixel, namely black-black, black-white, white-black and white-white. However, only black-black, black-white and white-white can be achieved with this known arrangement.

JP H06-120324 (filing number) discloses an arrangement in which a plurality of electrodes is simultaneously addressed. However, this driving scheme requires data voltages of different amplitudes, which results in differences in FLC memory angles in the pixels. Further, independent control for the plurality of electrodes which are scanned simultaneously cannot be achieved In particular, for n electrodes as described hereinbefore, only (n+1) switching states can be achieved as opposed to the theoretically available $2^n$ states.

SUMMARY OF THE INVENTION

According to a first aspect of the invention, there is provided a liquid crystal device comprising: a plurality of strobe electrodes; a plurality of data electrodes; a plurality of liquid crystal picture elements formed at intersections between the data electrodes and the strobe electrodes; and a strobe signal generator arranged to supply N strobe signals sequentially to N strobe electrodes, where N is an integer greater than one and the N strobe signals are supplied simultaneously to the strobe electrodes of each group, characterised by a data signal generator arranged to supply any selected one of a plurality of different data signals to each of the data electrodes in synchronism with the strobe signals, wherein each of the N strobe signals comprises a strobe pulse and a prepulse period during which the strobe signal has an amplitude less than the maximum amplitude thereof and wherein the prepulse periods of the N strobe signals are different from each other.

The plurality of data signals may comprise $2^N$ different data signals.

The number N may be equal to 2;

The N strobe signals may have different amplitudes.

The N strobe signals may have different waveforms.

A layer of bistable liquid crystal may be disposed between the data electrodes and the strobe electrodes. The liquid crystal may be a ferroelectric liquid crystal. The liquid crystal may have a minimum in its $\tau$-V characteristic.

Each of the data signals may have no net DC component.

The data signals may have the same RMS value.

The data signals may have the same polarity behaviour with time.

According to a second aspect of the invention, there is provided a method of addressing a liquid crystal device of the type comprising a plurality of data electrodes, a plurality of strobe electrodes, and a plurality of liquid crystal picture elements formed at intersections between the data electrodes and the strobe electrodes, the method comprising the steps of supplying N strobe signals sequentially to groups of N strobe electrodes, where N is an integer greater than one and the N strobe signals are supplied simultaneously to the strobe electrodes of each group, and supplying any selected one of a plurality of different data signals to each of the data electrodes in synchronism with the strobe signals, wherein each of the N strobe signals comprises a strobe pulse and a prepulse period during which the strobe signal has an amplitude less than half the maximum amplitude thereof and wherein the prepulse periods of the N strobe signals are different from each other.

BRIEF DESCRIPTION OF THE DRAWINGS

It is thus possible to provide an arrangement in which the effective scanning rate of a device such as an FLCD can be increased and/or power dissipation and heating of such a device can be reduced. It is further possible to provide an arrangement having uniform memory angle throughout the device. Thus, a display panel of uniform appearance and with a rapid refresh rate can be provided, for instance for use as a large high content display panel. Frame refresh rates may be sufficiently high for such panels to be used in HDTV, even when temporal dithering techniques are applied to achieve grey scale.

The invention will be further described, by way of example, with reference to the accompanying drawings, in which.

DETAILED DESCRIPTION OF THE INVENTION

Figure 1A:
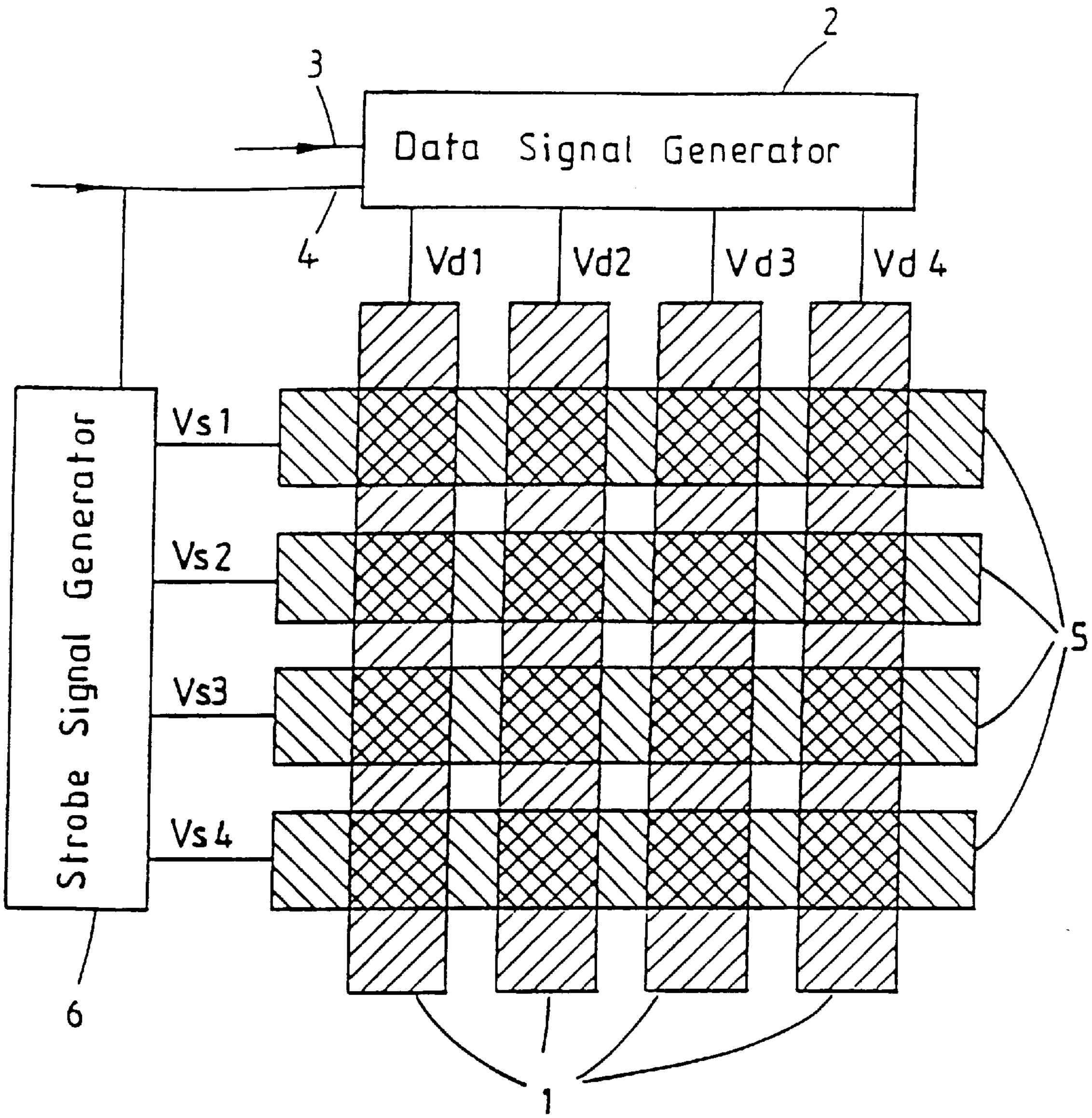
FIGS. 1*a* and 1*b* are schematic plan and cross-sectional views, respectively, of an FLCD constituting an embodiment of the invention.

Like reference numerals refer to like parts throughout the drawings.

Figure 1B:
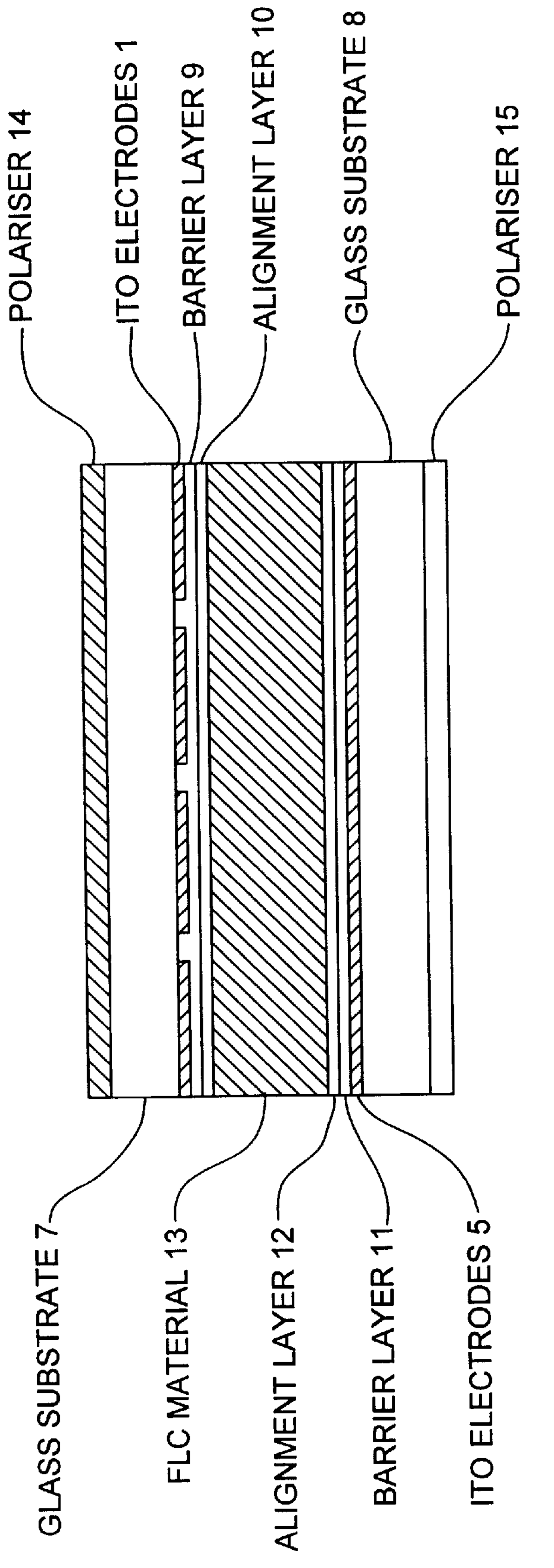

FIGS. 1*a* and 1*b* show a ferroelectric liquid crystal display comprising a 4×4 array of picture elements (pixels). In practice, such a display would comprise many more pixels arranged as a square or rectangular matrix but a 4×4 array has been shown for the sake of simplicity of description.

The display comprises four column or data electrodes 1 connected to respective outputs of a data signal generator 2 so as to receive data signals Vd1 to Vd4. The generator 2 has a data input 3 for receiving data to be displayed. The generator 2 has a synchronising input 4 for receiving timing signals so as to control the timing of the supply of the data signals Vd1 to Vd4 simultaneously to the data electrodes 1.

The display further comprises four row or strobe electrodes 5 connected to respective outputs of a strobe signal generator 6 so as to receive respective strobe signals Vs1 to Vs4. The generator 6 has a synchronising input which is also connected to receive timing signals for controlling the timing of supply of the strobe signals Vs1 to Vs4 to the strobe electrodes 5.

The structure of the display is shown in more detail in FIG. 1*b*. The data electrodes 1 are made, for example, of indium tin oxide (ITO) and are formed on a glass substrate 7. Similarly, the strobe electrodes 5 may also be made of ITO and are formed on a glass substrate 8. The data electrodes 1 are covered by a barrier layer which carries an alignment layer 10. Similarly, the strobes strobe electrodes 5 are covered by a barrier layer 11 which carries an alignment layer 12. The substrates 7 and 8 and the associated layers are spaced apart to form a cell which contains an FLC material layer 13. The cell is disposed between polarisers 14 and 15 whose polarising axes may be parallel or orthogonal. The alignment layers 10 and 12 may be of any form suitable for aligning ferroelectric liquid crystal, such as rubbed polyimide.

Figure 13:
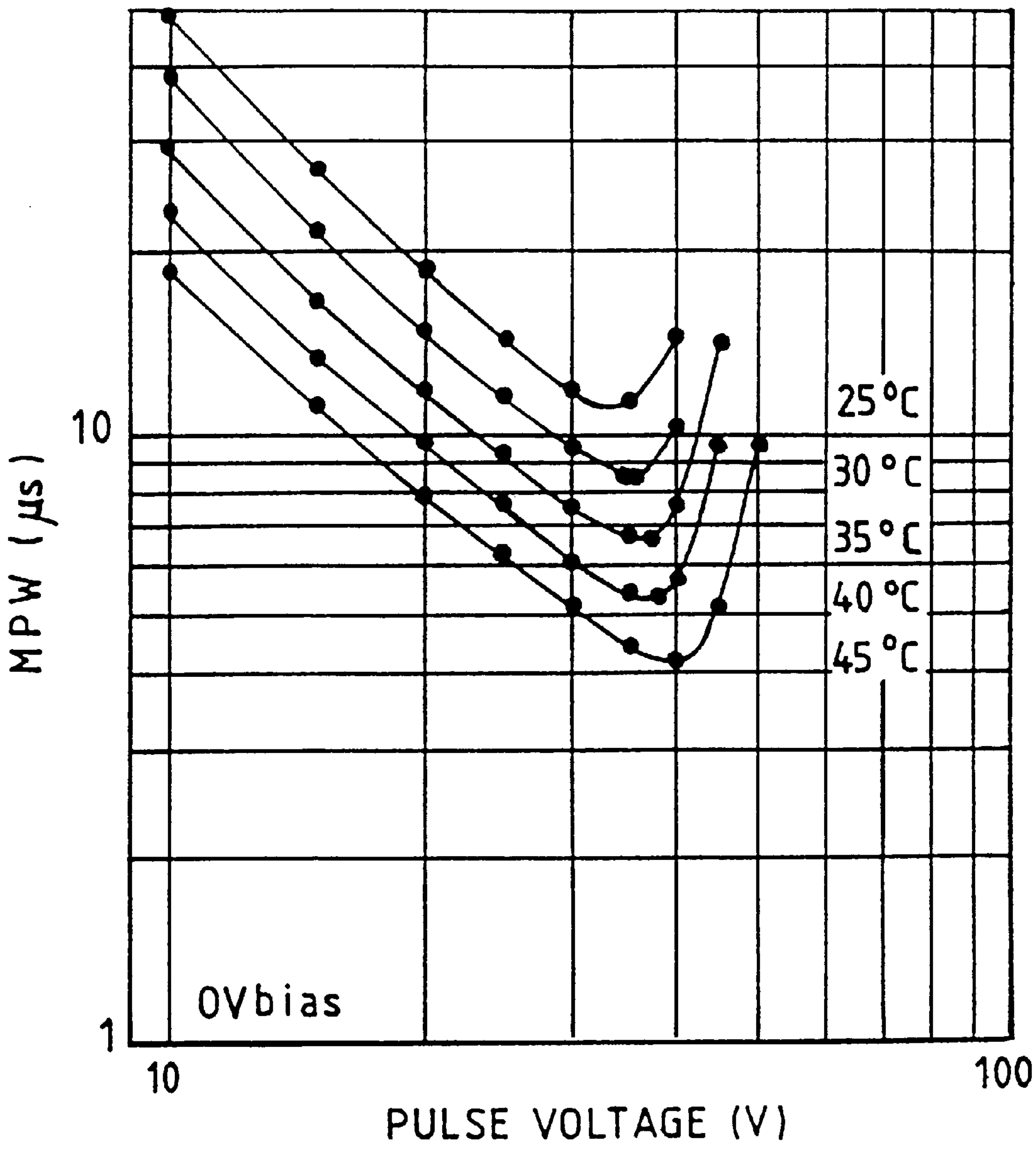
FIG. 13 shows τ-V characteristics for a suitable ferroelectric liquid crystal.

The ferroelectric liquid crystal has a chiral smectic C phase at the operating temperature, exhibits minima in its τ-V characteristics, and has a low spontaneous polarisation (preferably less than 20 $nC/cm^2$). The cone angle at the operating temperature is between 10° and 45° and preferably 22.5°. The alignment layers 10, 12 are parallel—aligned and give a low surface tilt angle, for instance less than 6°, to achieve the C2 uniform alignment state. The uniaxial dielectric anisotropy is negative or zero. An example of a suitable material has a phase sequence temperature of:

Sm C–65°–Sm A–86°–N–98°–Iso

Where Sm C and Sm A are smectic C and A phases, respectively, N is the nematic state, and Iso is the isotropic phase. Using a 50 kHz AC bias, a memory angle of 26° is obtained at 8 volts, 29° at 9 volts and 31° at 10 volts. The material has τ-V characteristics (without bias) at various temperatures as shown in FIG. 13.

The intersections between the data electrodes 1 and the strobe electrodes 5 define individual pixels which are addressable independently of each other.

Figure 2:
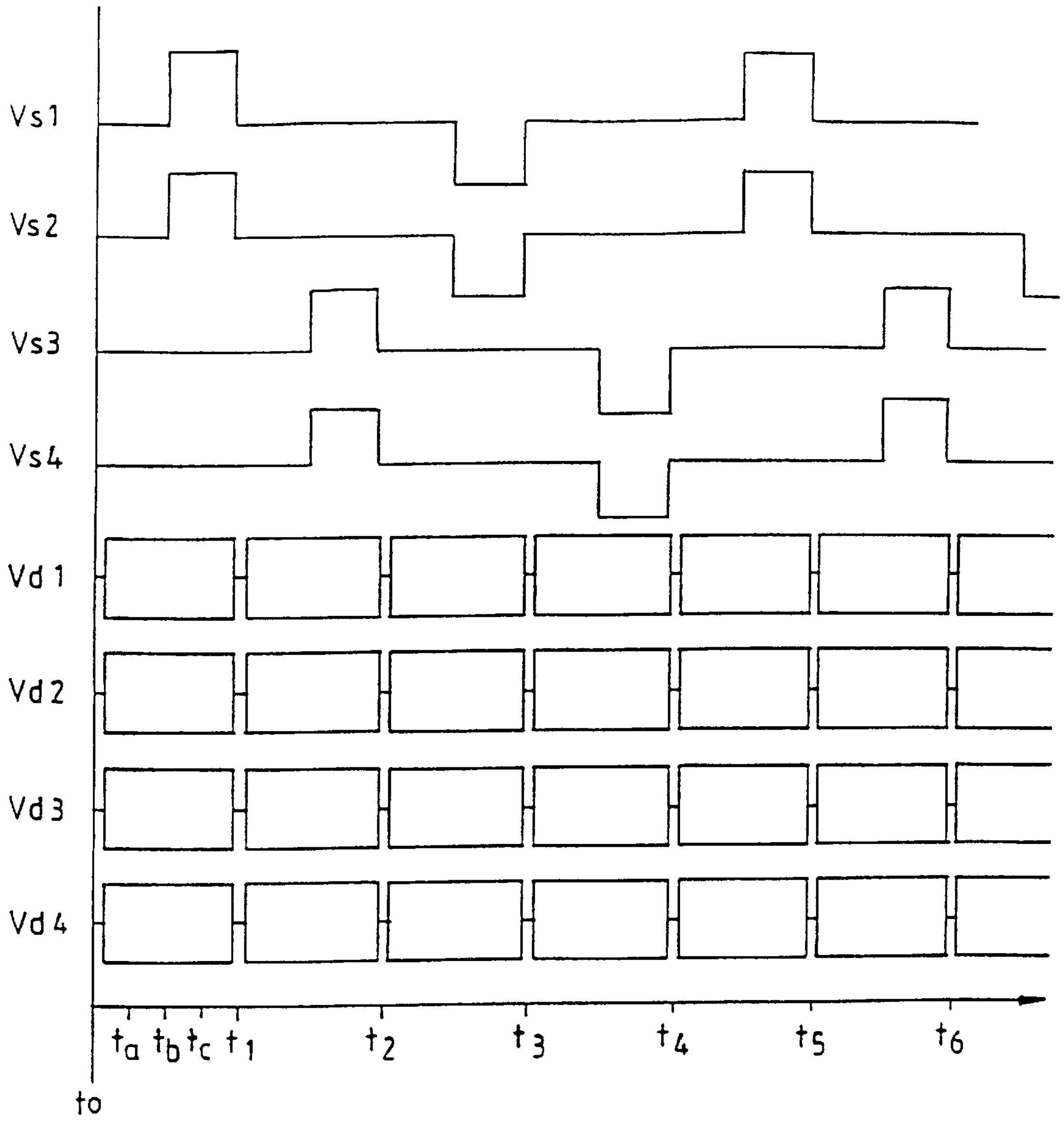
FIG. 2 is a timing diagram illustrating the timing of strobe and data signals for the display of FIG. 1.

FIG. 2 illustrates diagrammatically the relative timing of the data and strobe signals in the display shown in FIG. 1. N strobe signals are supplied in sequence to groups of N strobe electrodes, where N is an integer greater than one. The N strobe signals are supplied simultaneously to the N strobe electrodes of each group. In the embodiment illustrated in FIG. 2, N is equal to two. Thus, strobe signals Vs1 and Vs2 are supplied simultaneously to the corresponding strobe electrodes in a first line address time (LAT) from $t_0$ to $t_1$ and strobe signals Vs3 and Vs4 are supplied simultaneously to their respective strobe electrodes in a succeeding LAT from $t_1$ to $t_2$. The data signals Vd1 to Vd4 are supplied simultaneously with each other and in synchronism with the strobe signals. For the purpose of illustration, each data signal is represented by a rectangular box in FIG. 2. Also, gaps are shown between consecutive data signals for the purpose of clarity although, in practice, consecutive data signals are contiguous.

In order to provide DC balancing so that no net direct component is applied, on average, to the pixels and hence to avoid material degradation caused by electrochemical effects, the strobe and data signals are inverted in polarity in alternate frames.

Blanking pulses for resetting to black or white states all pixels belonging to the strobed electrodes may be supplied before the strobe signals. In this case, the blanking and strobe pulses are DC balanced so that the polarity of these pulses need not be inverted from frame to frame.

Figure 3:
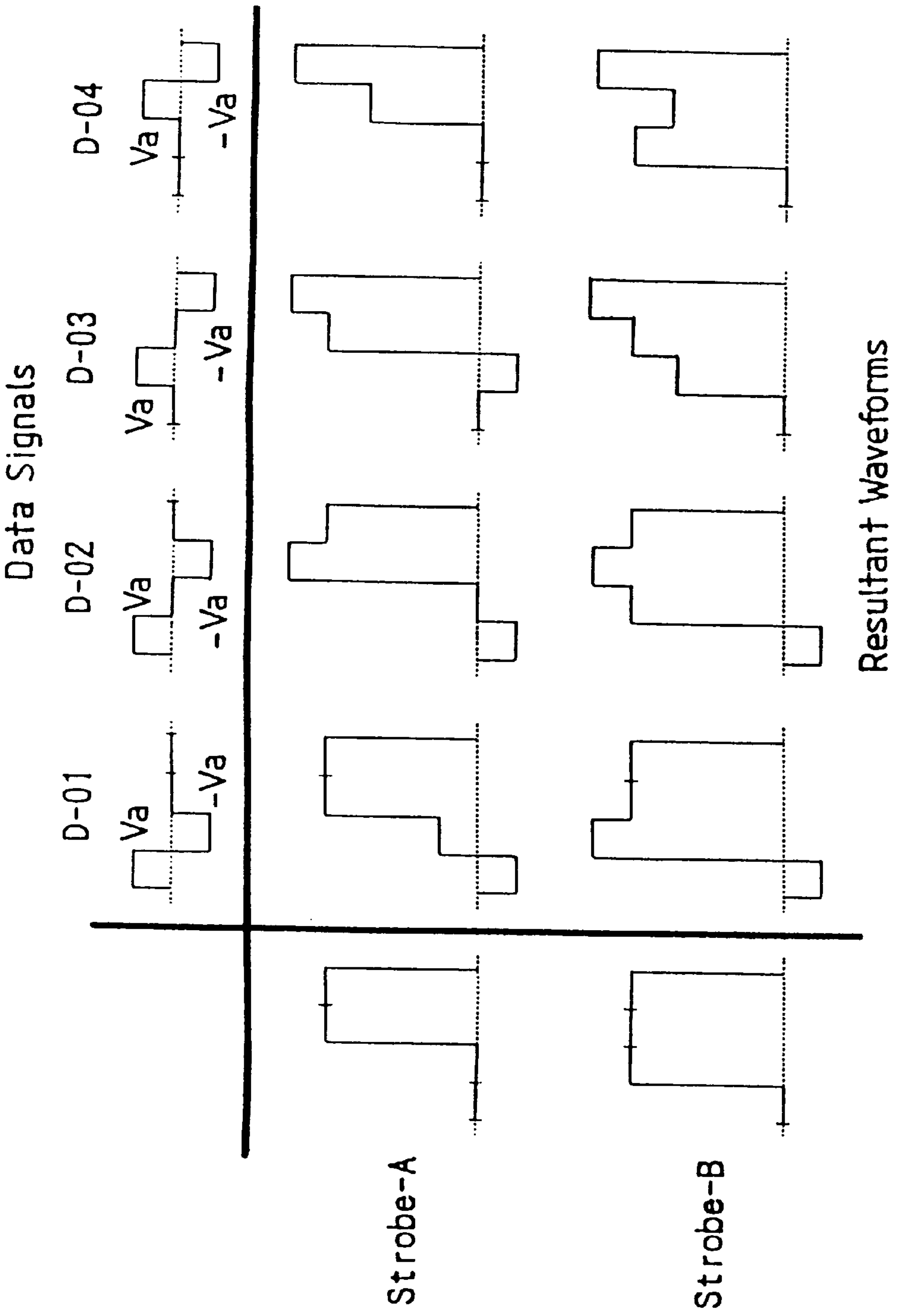
FIG. 3 illustrates a first set of data signals and first and second strobe signals produced in the display shown in FIG. 1.

A first set of data and strobe waveforms is illustrated in FIG. 3. As shown in FIG. 2, each LAT such as the first LAT is subdivided into time slots, for instance as indicated at $t_a$, $t_b$ and $t_c$ for four time slots per LAT. FIG. 3 illustrates the two strobe waveforms referred to as Strobe-A and Strobe-B which are applied simultaneously to the pairs of strobe electrodes during each LAT. The data signals actually supplied to the data electrodes are selected from the four signals D-01 to D-04 illustrated in FIG. 3 depending on the image data to be displayed in the two rows of pixels addressed in each LAT. The resultant waveforms appearing across the pixels for all of the combinations of strobe and data signals are shown in FIG. 3.

The strobe signals Strobe-A and Strobe-B are different from each other but are repeated during each LAT. Each strobe signal comprises a prepulse period followed by a strobe pulse. The prepulse periods are those periods before the amplitude of the strobe signal reaches 50% of its maximum value. The prepulse periods of the different strobe signals are different. As shown in FIG. 3, the prepulse period of the strobe signal Strobe-A comprises the first two time slots whereas the prepulse period of the strobe signal Strobe-B comprises the first time slot.

The data signals D-01 to D-04 are different from each other but have some common features. For instance, each data signal has no net DC component. Also, the data signals have the same RMS voltage. Further, the data signals have the same polarity behaviour with time. In particular, each data signal comprises a positive pulse followed by a negative pulse.

Figure 4:
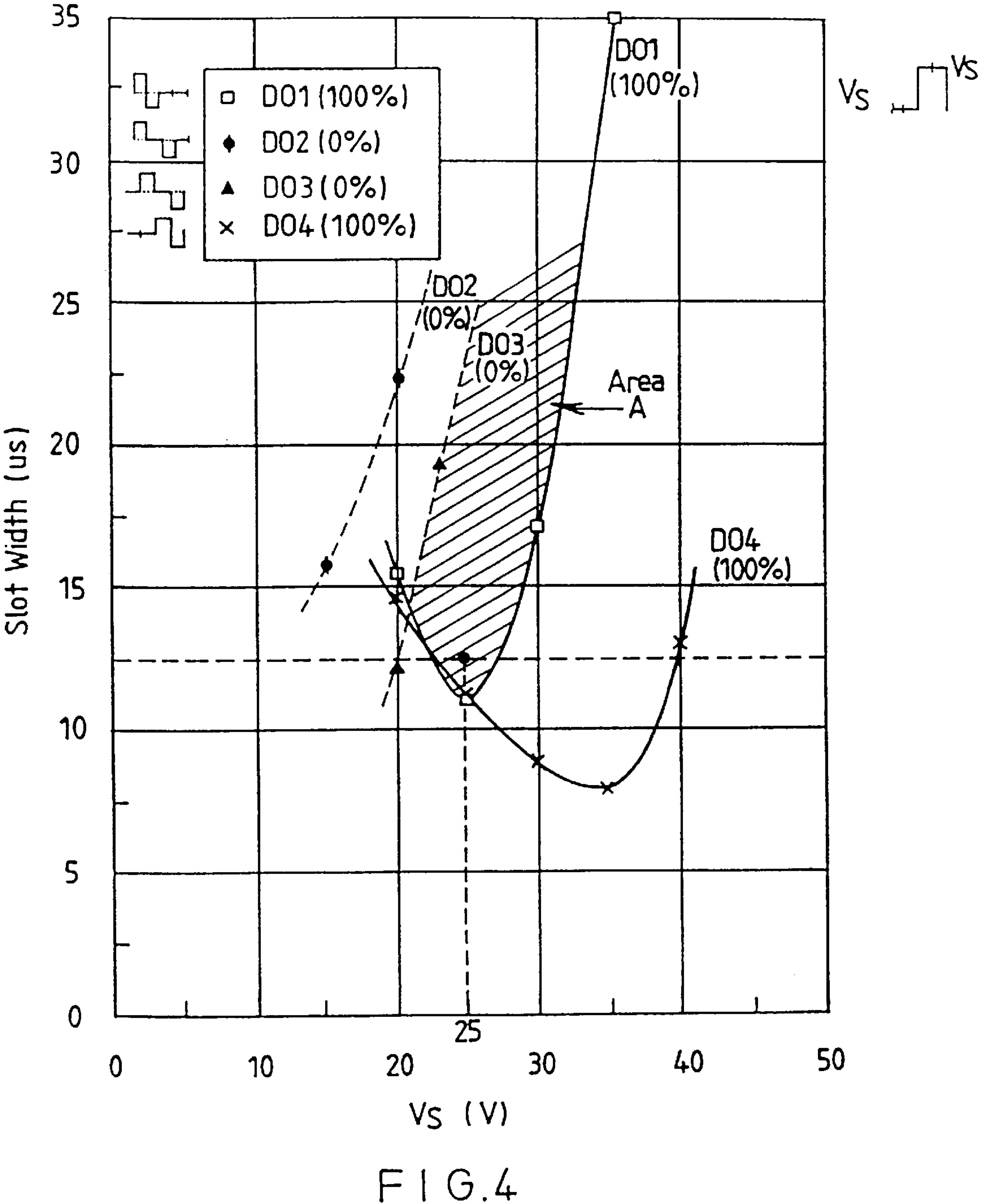
FIGS. 4 and 5 are graphs of slot width τ in microseconds against strobe signal amplitude or voltage in volts illustrating the τ-V characteristics obtained using the data signals and first and second strobe signals, respectively, shown in FIG. 3.
Figure 5:
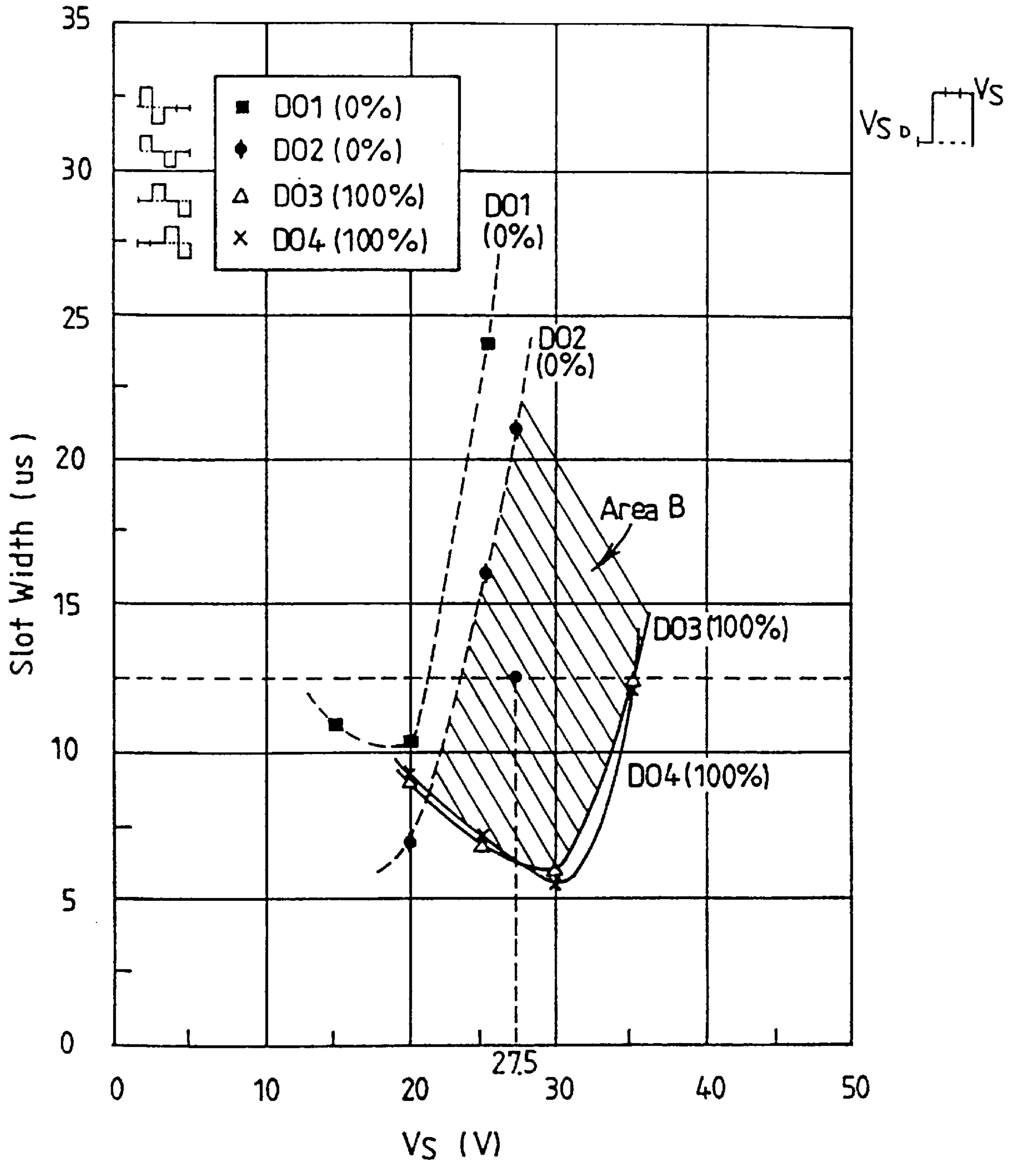

FIGS. 4 and 5 illustrate the τ-V characteristics of the pixels for the strobe signals Strobe-A and Strobe-B, respectively, with the different data signals. For a typical waveform set, the strobe signals occupy four time slots of 12.5 microseconds to give an LAT of 50 microseconds. Strobe-A has an amplitude of 25 volts whereas Strobe-B has an amplitude of 27.5 volts. Each of the data signals comprises a positive pulse and a negative pulse, each of which has an amplitude Va, for instance, of 8 volts giving an RMS value of 5.66 volts for all of the data signals.

In general, where N strobe electrodes are strobed at a time, by providing $2^N$ suitable data signals, all of the pixels of the N rows can be independently addressed. The optical state of a pixel is unswitched when the waveform across it is such that the average value in the first two time slots is negative. The optical state of a pixel is switched when the waveform across it is such that the average value in the first two time slots is zero or positive, unless the value in the first slot is negative and the value in the second slot is greater than or equal to the value of the strobe pulse, in which case the optical state of the pixel is unswitched.

For the specific example illustrated in FIG. 3 and described hereinbefore, the data signal D-01 causes switching of each pixel strobed by Strobe-A whereas each pixel strobed by Strobe-B is unswitched. When the data signal D-02 is supplied, no pixels are switched irrespective of which strobe signal is applied. When the data signal D-03 is applied, pixels strobed by Strobe-A are unswitched but pixels strobed by Strobe-B are switched. When the data signal D-04 is applied, all pixels are switched irrespective of which strobe signal they receive. Thus, the full $2^N$ states of the two pixels in each column can be independently addressed and controlled. In the present case, there are four such states as described hereinbefore.

The τ-V curves illustrated in FIGS. 4 and 5 for the data signals are further classified as 0% curves which show slot widths for pixels to start switching and 100% curves which show slot width for pixels to switch fully. Thus, driving conditions above the 100% curves give pixel switching whereas drive conditions bellow the 0% curves give pixel non-switching. The area A shown in FIG. 4, which is above the curves for the data signals D-01 and D-04 and below the curves for D-02 and D-03, is the effective working area for Strobe-A. Similarly, in FIG. 5, the area B, which is above the curves for the data signals D-03 and D-04 and below the curves for the data signals D-01 and D-02, is the effective working area for Strobe-B. Thus, data signals D-01 and D-04 give switching and data signals D-02 and D-03 give non-switching for Strobe-A. The data signals D-03 and D-04 give switching and the data signals D-01 and D-02 give non-switching for Strobe-B. The area of overlap between the areas A and B is the working area for this addressing scheme in that, under any conditions in the overlapping area, independent switching can be achieved for the two lines of pixels which are simultaneously strobed using the waveforms shown in FIG. 3.

Figure 6:
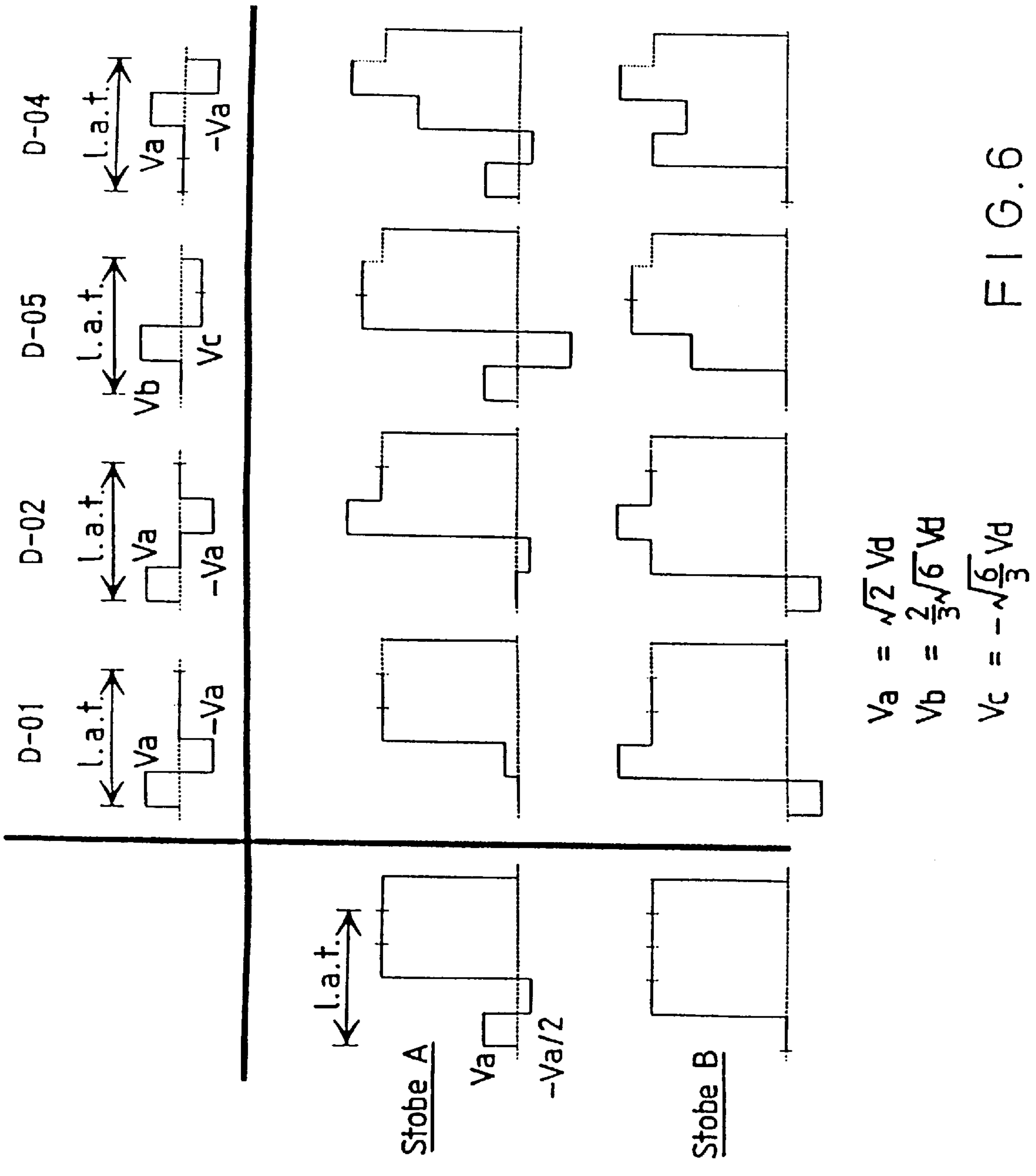
FIG. 6 illustrates another set of data and first and second strobe signals which may be used in the display of FIG. 1.

FIG. 6 illustrates another set of signals for addressing the FLCD of FIG. 1. The strobe signals Strobe-A and Strobe-B are applied simultaneously to pairs of lines and are extended by one time slot beyond the LAT in accordance with the Malvern scheme, for instance as disclosed by J. R. Hughes and E. P. Raynes, Liquid Crystal 13, 597, 1993. The data signals D-01, D-02 and D-04 are as shown in FIG. 3 but the data signal D-03 is replaced with a different data signal D-05. All of the data signals have an RMS voltage of 5.66 volts with Va being 8 volts. The amplitudes Vb and Vc are given by:

$$Vb=2\sqrt{6}Vd/3$$

$$Vc=-\sqrt{6}Vd/3$$

where Vd is the RMS voltage of the data signals.

Figure 7:
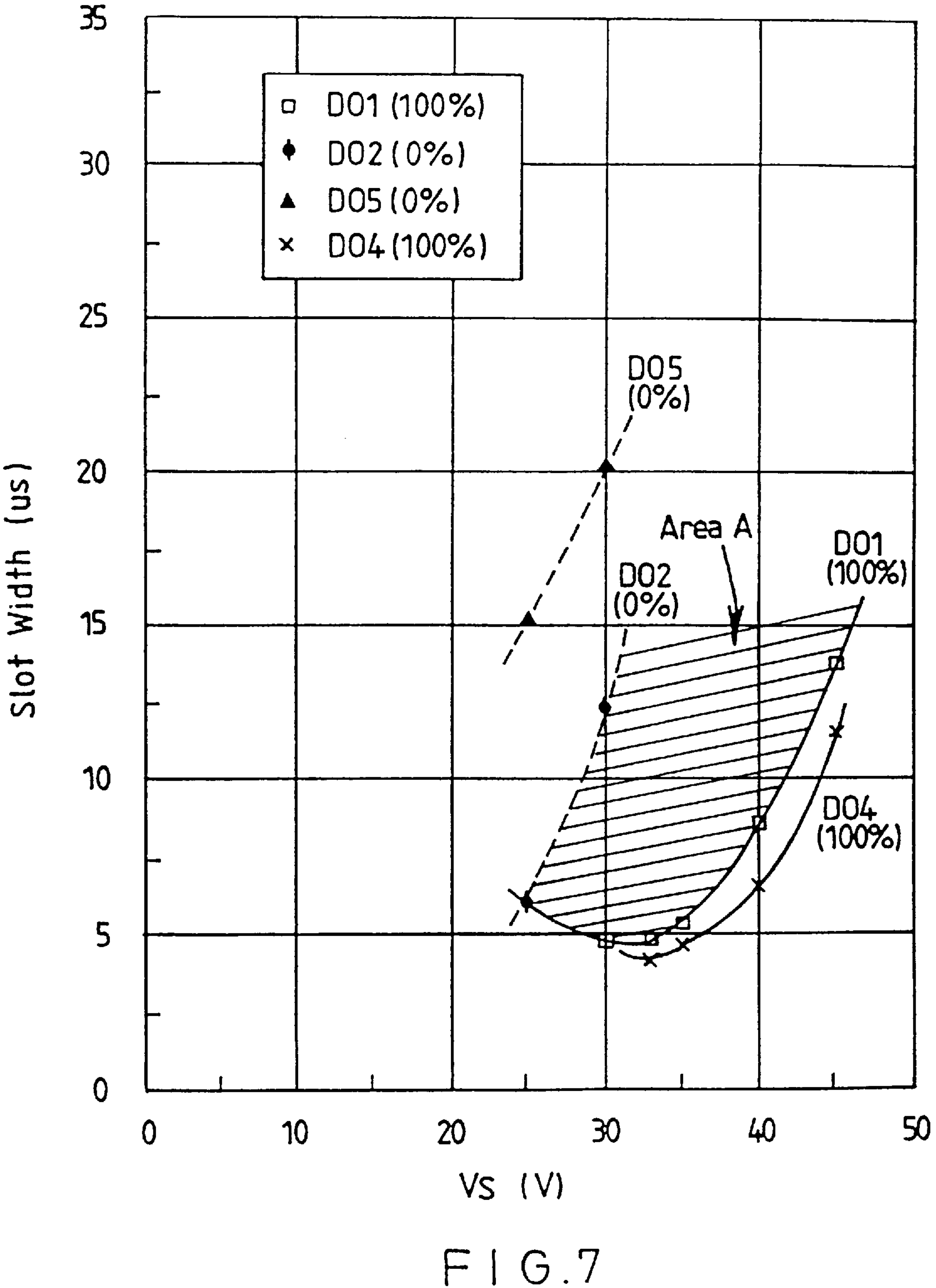
FIGS. 7 and 8 correspond to FIGS. 4 and 5, respectively, but illustrate the τ-V characteristics for the signals of FIG. 6.
Figure 8:
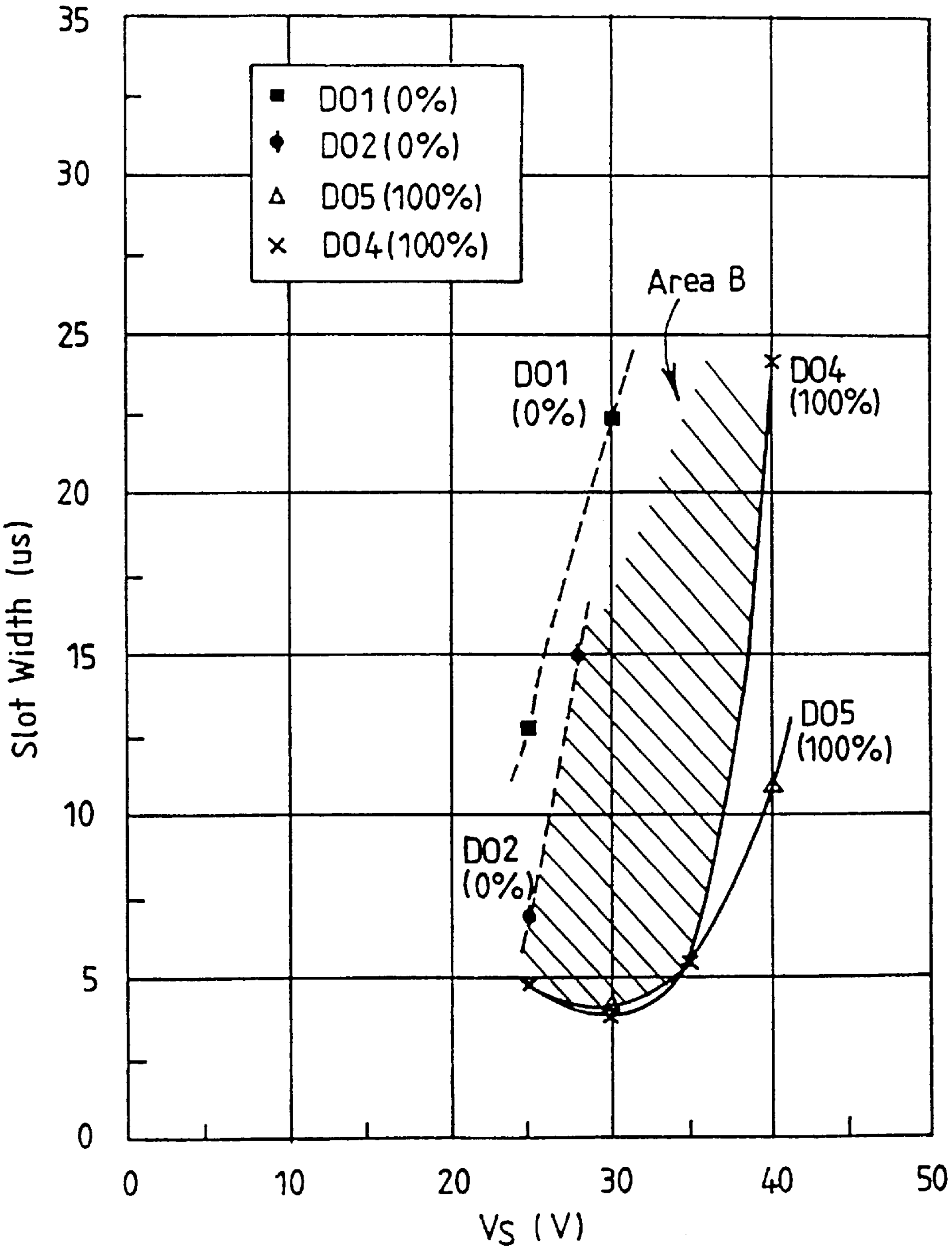
Figure 9:
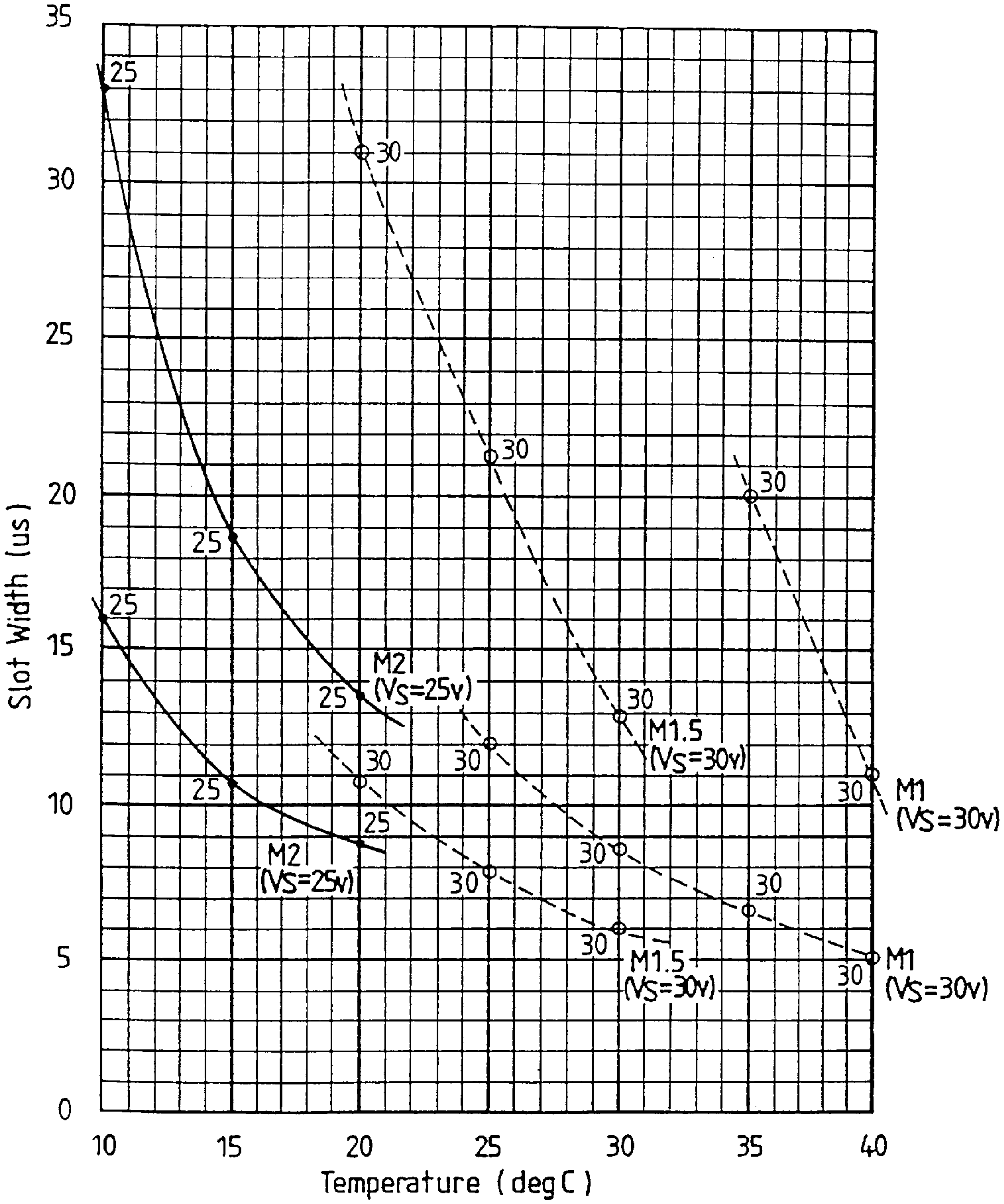
FIGS. 9 and 10 are graphs of slot width in microseconds against temperature in degrees centigrade illustrating the temperature dependence of driving windows using the waveforms illustrated in FIG. 3 with various Malvern expansions for the first and second strobe signals, respectively.
Figure 10:
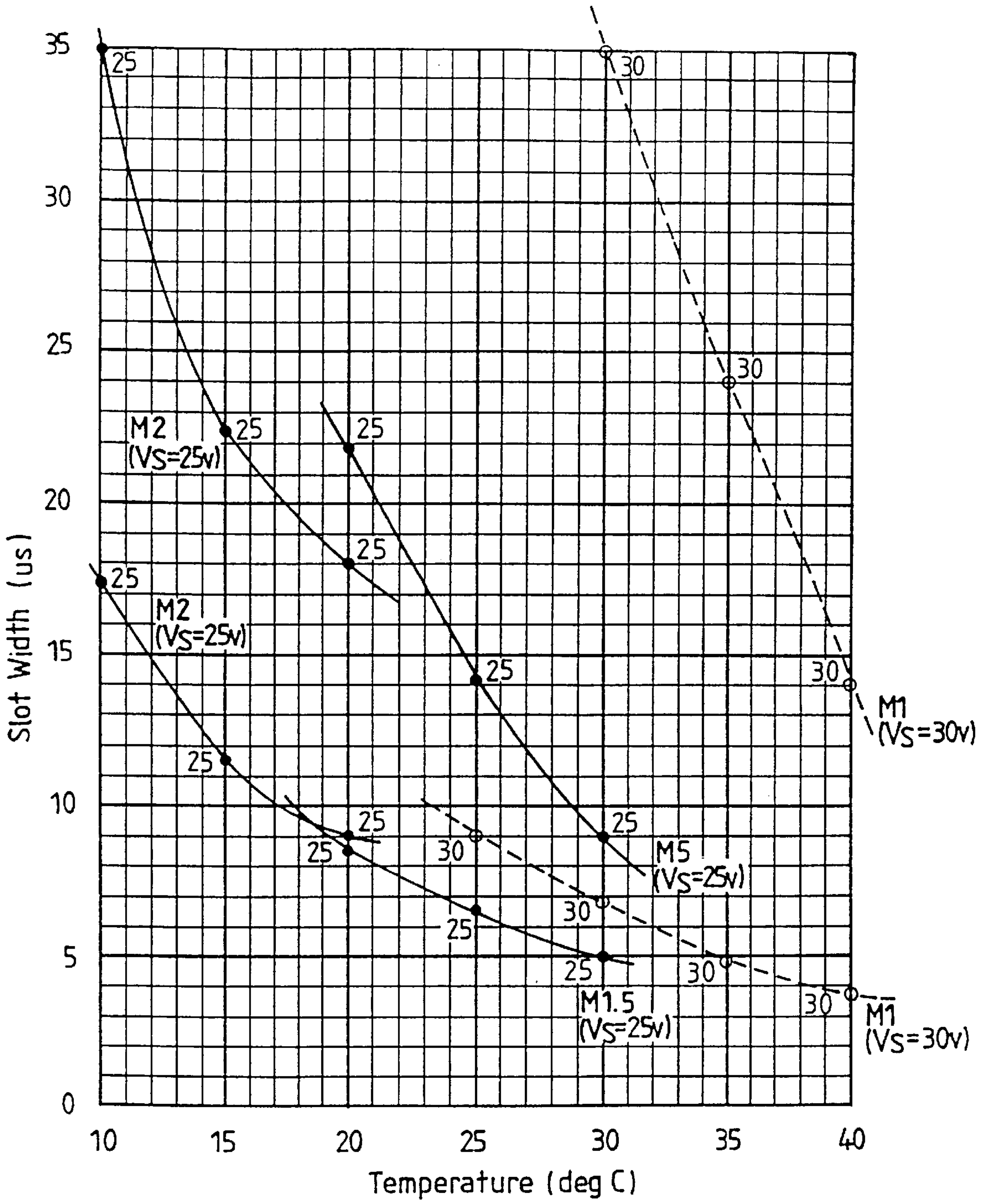

FIGS. 7 and 8 show the τ-V curves for Strobe-A and Strobe-B, respectively. The shaded areas at A and B indicate the working regions. For a slot width of 5.5 microseconds, giving an LAT of 22 microseconds, and amplitudes of 32.5 and 30 volts for Strobe-A and Strobe-B, pixel switching occurs for the combinations of data signals D-01 and D-04 with Strobe-A and for data signals D-05 and D-04 with Strobe-B. Other combinations result in non-switching of the addressed pixel. Thus, as for the waveforms illustrated in FIG. 3, each pair of pixels in simultaneously strobed rows can be controlled by a common one of the data signals so as to adopt any of the four possible combinations of optical states. FIGS. 9 and 10 illustrate the temperature dependence of driving windows using the waveforms shown in FIG. 6 but with various Malvern expansions as disclosed in the Hughes and Raynes reference mentioned hereinbefore.

FIGS. 9 and 10 illustrate the temperature dependence for Strobe-A and Strobe-B, respectively, and the references M1, M1.5 and M2 refer to no Malvern extension, Malvern extension by half a time slot, and Malvern extension by one time slot. The upper and lower curves for each expansion illustrate the maximum and minimum slot widths which give clear switching, so that driving conditions should be set between these curves.

Figure 11:
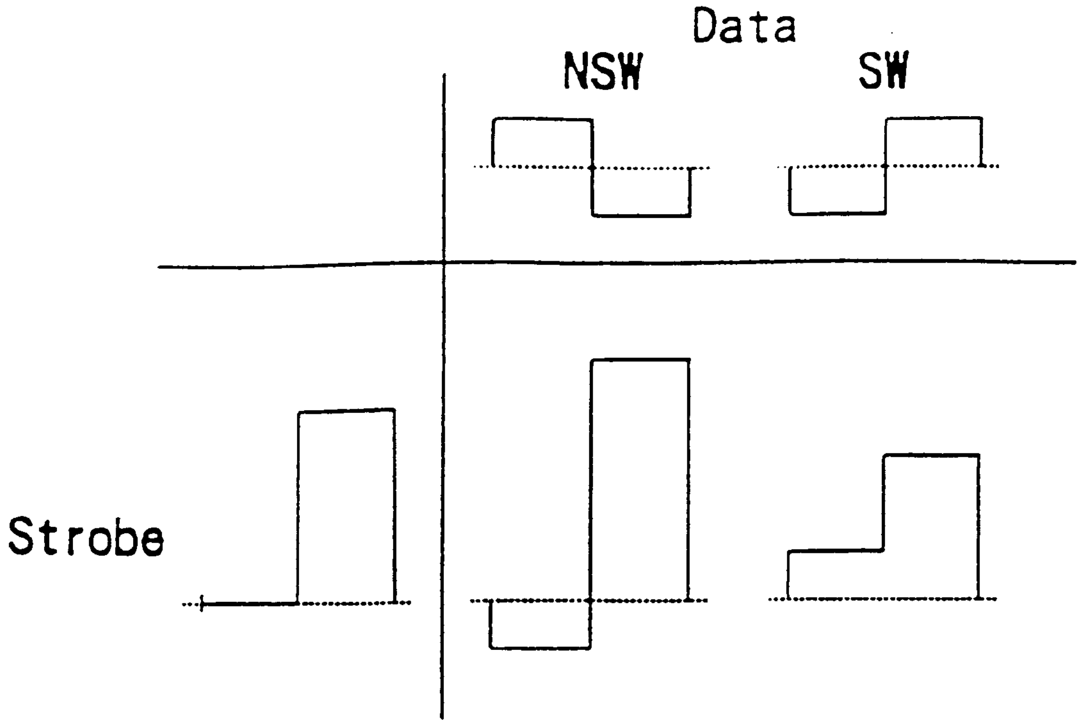
FIG. 11 illustrates strobe and data signals of a known scheme referred to as the JOERS/ALVEY scheme.
Figure 12:
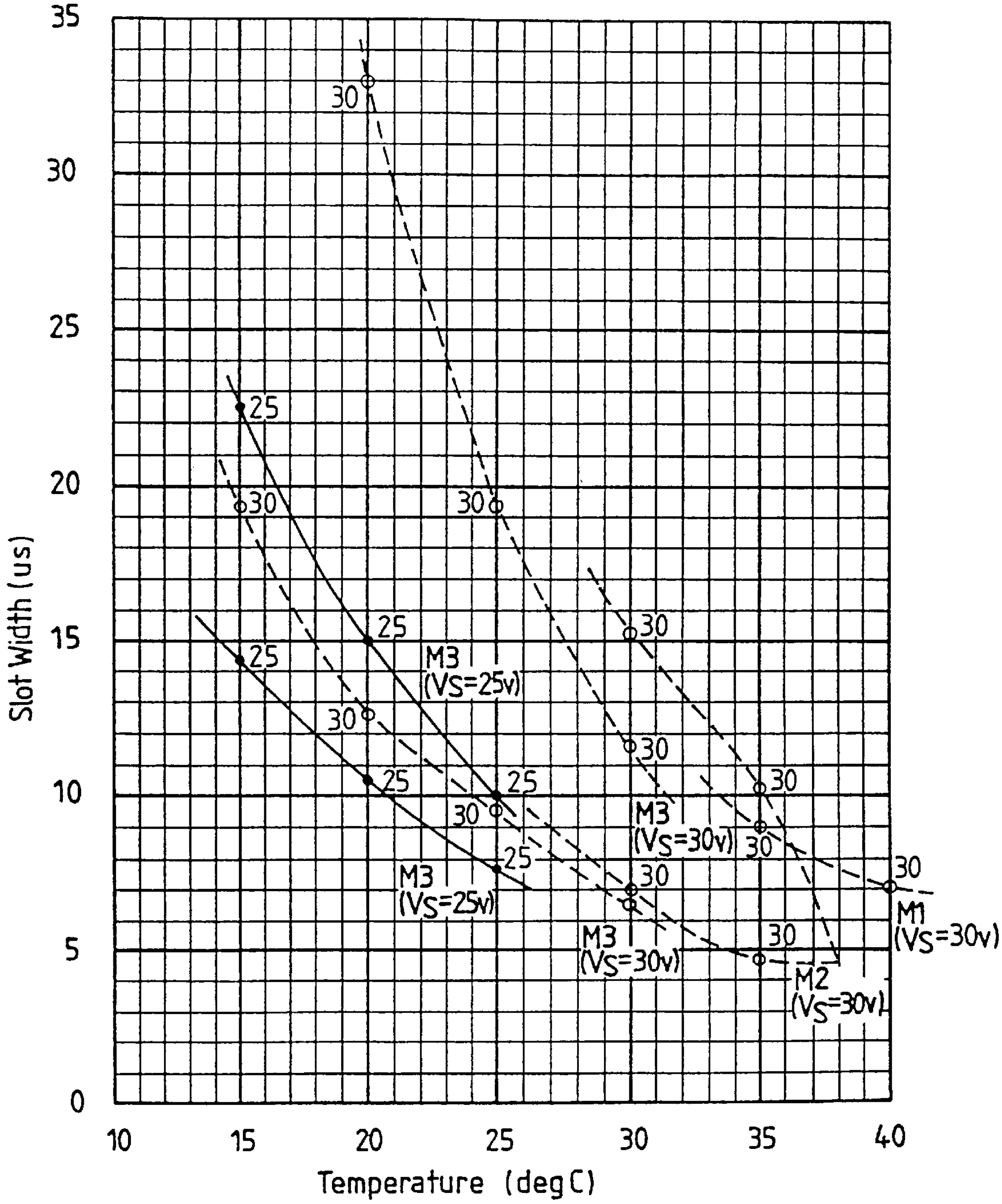
FIG. 12 is another graph showing the temperature dependence of the driving window using the waveforms shown in FIG. 11.

FIG. 11 illustrates the waveforms of a known driving scheme referred to as the JOERS/ALVEY driving scheme, for instance as disclosed by P. W. H. Surguy et al in Ferroelectrics, 122, 63, 1991. FIG. 12 corresponds to FIGS. 9 and 10 but illustrates the temperature dependence using the waveforms of FIG. 11 with various Malvern expansions such that M1 refers to no Malvem expansion, M2 refers to Malvern expansion by one time slot, and M3 refers to Malvern expansion by two time slots. Again, the upper and lower curves for each expansion illustrate the maximum and minimum slot widths for clear switching.

In FIGS. 9, 10 and 12, the vertical axes represent slot widths such that twice these values correspond to the LAT for a single line. In particular, for the waveforms shown in FIG. 6, two lines are scanned in four time slots whereas, for the known waveforms shown in FIG. 11, two time slots are used to scan each line. Thus, for the same LAT, the waveforms shown in FIG. 6 provide a larger temperature margin and driving margin than the known waveforms shown in FIG. 11.

It is thus possible to provide a device such as a ferroelectric liquid crystal device in which the effective scanning rate can be increased and/or power dissipation and heating of the device can be reduced. Strobe signals are supplied sequentially to groups of more than one strobe electrode of the device and any of a plurality of different data signals are supplied to each of a plurality of data electrodes of the device. It is thus possible to provide a display in which all combinations of optical states of pixels can be achieved for pixels which are connected to the same respective data electrodes and which are strobed simultaneously.

It is further possible to an arrangement having uniform memory angle throughout the device. As a result, a display panel of uniform appearance and having a rapid refresh rate is made possible. Such a display panel may be used, for example, as a large high content display panel. The frame refresh rate may be made sufficiently high such that the display panel may be used in high definition television (HDTV), even when temporal dithering techniques are applied to achieve grey scale.

What is claimed is:

1. A liquid crystal device comprising:

a plurality of strobe electrodes;

a plurality of data electrodes;

a plurality of liquid crystal picture elements formed at intersections between the data electrodes and the strobe electrodes; and a strobe signal generator arranged to supply N strobe signals sequentially to groups of N strobe electrodes, where N is an integer greater than one and the N strobe signals are supplied simultaneously to the strobe electrodes of each group, wherein a data signal generator is arranged to supply any selected one of a plurality of different data signals to each of the data electrodes in synchronism with the strobe signals, and wherein each of the N strobe signals comprises a strobe pulse and a prepulse period during which the strobe signal has an amplitude less than half the maximum amplitude thereof and wherein the prepulse periods of the N strobe signals are different from each other.

2. A device as claimed in claim 1, wherein the plurality of different data signals comprises $2^N$ different data signals.

3. A device as claimed in claim 1, wherein N=2.

4. A device as claimed in claim 1, wherein the N strobe signals have different amplitudes.

5. A device as claimed in claim 1, wherein the N strobe signals have different waveforms.

6. A device as claimed in claim 1, wherein a layer of bistable liquid crystal is disposed between the data electrodes and the strobe electrodes.

7. A device as claimed in claim 6, wherein at the liquid crystal is a ferroelectric liquid crystal.

8. A device as claimed in claim 6, wherein the liquid crystal has a minimum in its $\tau$-V characteristic.

9. A device as claimed in claim 1, wherein each of the data signals has no net D.C. component.

10. A device as claimed in claim 1, wherein the data signals have the same RMS value.

11. A device as claimed in claim 1, wherein the data signals have the same polarity behaviour with time.

12. A method of addressing a liquid crystal device of the type comprising a plurality of data electrodes, a plurality of strobe electrodes, and a plurality of liquid crystal picture elements formed at intersections between the data electrodes and the strobe electrodes, the method comprising the steps of:

supplying N strobe signals sequentially to groups of N strobe electrodes, where N is an integer greater than one and the N strobe signals are supplied simultaneously to the strobe electrodes of each group; and supplying any selected one of a plurality of different data signals to each of the data electrodes in synchronism with the strobe signals, wherein each of the N strobe signals comprises a strobe pulse and a prepulse period during which the strobe signal has an amplitude less than half the maximum amplitude thereof and wherein the prepulse periods of the N strobe signals are different from each other.

* * * * *